March 22, 1960  G. E. HURD, JR., ET AL  2,929,586
PROPELLER VIBRATION SUPPRESSOR
Filed Sept. 14, 1955  3 Sheets-Sheet 1

*INVENTORS*
GEORGE E. HURD JR.
HENRY JOSEPH JEWETT

By *George C. Sullivan*
Agent

March 22, 1960   G. E. HURD, JR., ET AL   2,929,586
PROPELLER VIBRATION SUPPRESSOR
Filed Sept. 14, 1955   3 Sheets-Sheet 2

INVENTORS
GEORGE E. HURD JR.
HENRY JOSEPH JEWETT

By
Agent

March 22, 1960  G. E. HURD, JR., ET AL  2,929,586
PROPELLER VIBRATION SUPPRESSOR
Filed Sept. 14, 1955  3 Sheets-Sheet 3
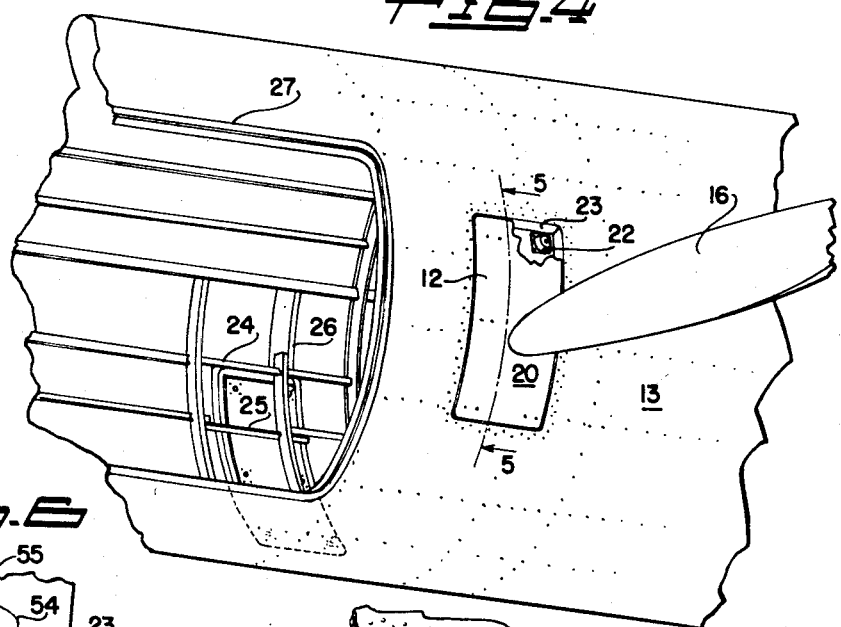
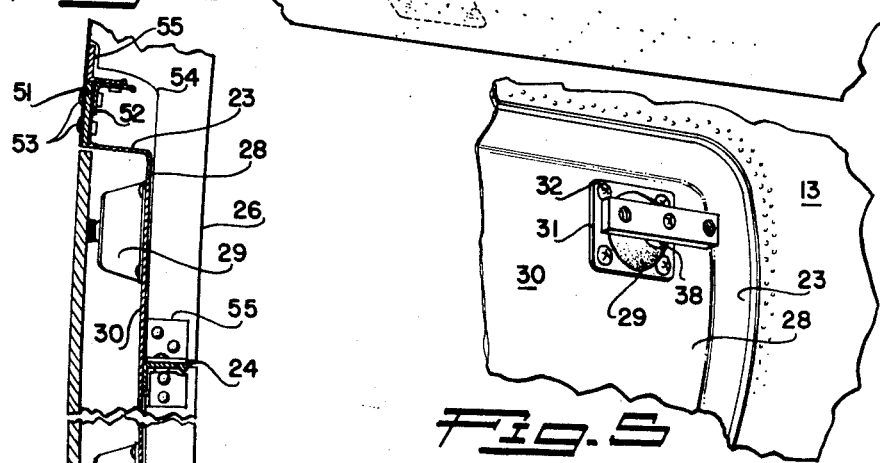
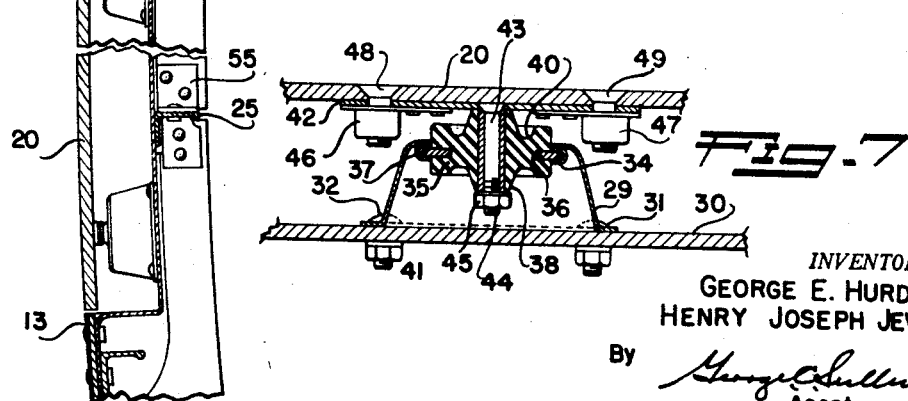
INVENTORS
GEORGE E. HURD JR.
HENRY JOSEPH JEWETT
By
Agent United States Patent Office 2,929,586
Patented Mar. 22, 1960

2,929,586

PROPELLER VIBRATION SUPPRESSOR

George E. Hurd, Jr., Sherman Oaks, and Henry Joseph Jewett, North Hollywood, Calif., assignors to Lockheed Aircraft Service, Inc., Burbank, Calif.

Application September 14, 1955, Serial No. 534,235

1 Claim. (Cl. 244—129)

This invention relates to vibration suppressors and more particularly to a vibration suppressing means employed in aircraft for reducing vibration and noise induced from propellers.

In the aircraft industry, it has been found desirable to reduce vibration of fuselage structure caused by the impinging of air shock waves generated by passing propeller blades in close proximity to the fuselage. Vibration reduction is especially important to provide personnel comfort and to maintain structure rigidity and stability within the fuselage. In the past, it has been the general practice to stiffen or reinforce the fuselage structure in the affected areas in order to absorb or dissipate the vibration. Difficulties have been encountered in strengthening the fuselage in this manner which are due in part to the weight and bulk involved. Also, it has been found that the stiffening of fuselage structure provides added material which sometimes has a tendency to propagate the induced vibrations and thereby defeats the purpose of employing stiffening material.

Another conventional practice has been to increase the clearance between the propeller and the fuselage. This practice has been very effective; however, this practice places limits on the design of the aircraft and provides little relief from induced vibration.

These difficulties are overcome in the present invention in which a skin panel or covering is resiliently installed in the fuselage. The panel is employed to receive the impact of shock waves generated by passing propeller blades. The skin panel is level with the normal fuselage skin located close to the arc of propeller blade rotation and is carried by resilient mountings attached to a base supported by the fuselage structure. Thus, it can be seen that by resiliently mounting a panel disconnected from the normal skin and locating the panel in such a manner to receive waves generated by propeller rotation, a skin area is effectively exposed which is capable of absorbing the shock waves without transmitting any induced vibrations to other parts of the aircraft.

In one form of the present invention there is provided a vibration suppressor comprising, a skin panel resiliently mounted on a base by means of resilient mounting means. The base has a well integral therewith adapted for an engagement with the fuselage structure. The well is constructed to accommodate as many mounting means as is necessary to effectively and resiliently mount the skin panel. Inasmuch as the well extends internally of the fuselage, the skin panel is arranged to be level with the skin of the fuselage. The skin panel is installed in an area of the fuselage skin closest to the arc of propeller blade rotation so that it will be in a rectilinear plane to receive the impact of air waves propagated from the propeller. In this manner the longitudinal air waves generated by the propeller blades will strike the panel and cause it to vibrate. Inasmuch as the panel is resiliently carried by the fuselage structure, the vibration will not be substantially transferred to other parts of the fuselage.

It is an object of the present invention to provide a practical means for reducing vibration induced in the fuselage of an aircraft by rotating propellers.

It is another object of the present invention to mount a skin panel or covering on an aircraft fuselage so that the panel is isolated from the surrounding fuselage skin but is level therewith.

It is still another object of the present invention to resiliently mount fuselage skin in close proximity to the arc of propeller blade rotation in such a location to receive the impact of impinging air waves generated by propeller rotation.

It is a further object to install a resilient skin panel on the fuselage structure of an aircraft in such a manner to accommodate the usual stresses and pressures encountered by the skin or covering of conventional fuselage structures.

These and other objects will be more clearly seen with reference to the drawings in which:

Figure 4 is a perspective view of a panel covering employed in a vibration suppressor showing its isolation from external fuselage skin and showing its location in relation to the arc of propeller blade rotation;

Figure 5 is an enlarged view of one form of resilient mounting means employed to carry the panel covering illustrated in Figure 4;

Figure 6 is an elevational view in section taken along line 5—5 of Figure 4 showing the vibration suppressor supported on fuselage structure;

Figure 7 is a sectional view of the mounting means employed in Figure 6; and

Figure 1:
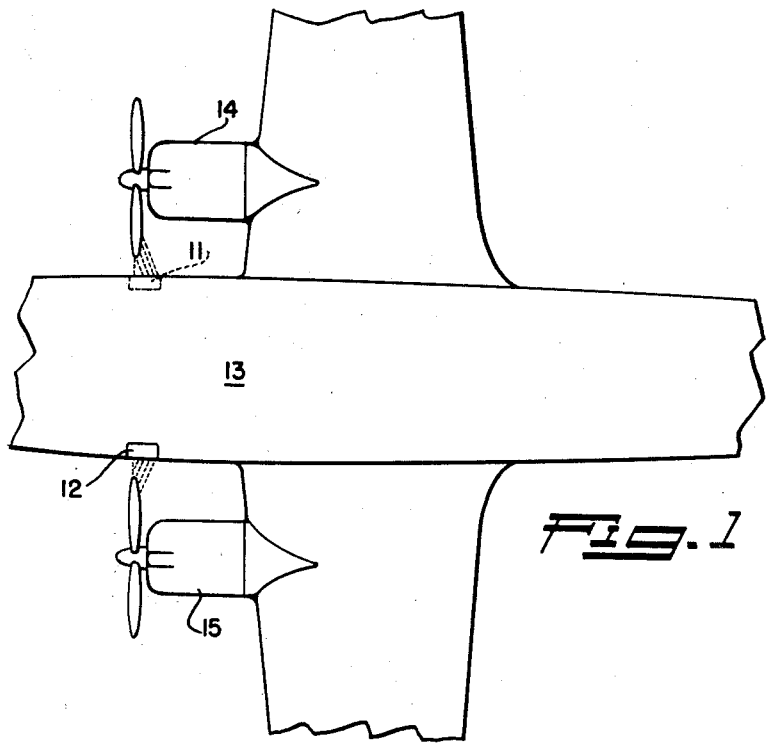
Figure 1 is a partial plan view of an airplane in accordance with the present invention showing vibration suppressors arranged in the plane of propeller rotation.
Figure 2:
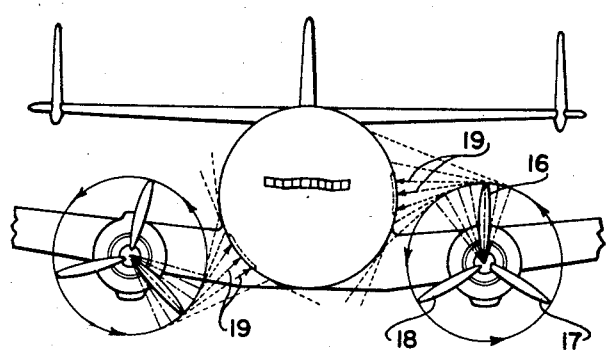
Figure 2 is a front view of the airplane employed in Figure 1 showing the vibration suppressors on either side of a fuselage disposed to intercept longitudinal waves propagated by the propellers.

Referring to Figures 1 and 2, a pair of vibration suppressors 11 and 12 constructed in accordance with the present invention are illustrated disposed about a fuselage 13 of one form of an aircraft having a propulsive means comprising a pair of engines 14 and 15 for rotating propellers, each having three blades represented by numerals 16, 17 and 18. The location of the suppressors on the fuselage is dictated by many variable factors such as propeller length, clearance between fuselage and propellers, number of blades, fuselage contour, propeller tip speed, etc. As illustrated, a circular fuselage is employed having the engines displaced equi-distant therefrom.

Undesirable vibrations are generally considered to consist of two components. One is the rotation note, which has a frequency equal to the number of rotations per second multiplied by the number of blades in the propeller. This is known as the fundamental note and is usually accompanied by a large number of harmonics. Usually there is more energy in the fundamental than in all other frequencies, so that it is the chief cause of propeller noise and vibration. The other component is the rotation or vortex generated vibrations. As the propeller rotates, it causes a turbulent air condition to be set up, in which vortices are shed off the blades. The rotation note and vortex generated vibrations are not equally intense in all directions about the propeller. The maximum intensity level occurs in the plane of the propeller blades and is due to the fundamental note. The vortex generated vibrations, on the other hand, are maximum along the axis of rotation of the propeller and thereby somewhat rearward of the plane of propeller rotation. The combined result is a cone-like wave propagation in the direction of the fuselage as shown in Figure 1. It is evident that proper positioning or locating of the suppressors relative to the propeller is of advantage.

With these factors in mind, the suppressors are arranged asymmetrically, as shown in Figure 2, in an area on opposite sides of the fuselage and associated with engines 14 and 15 respectively to intercept or receive the impact of air shock waves 19 propagated by the propellers. This area is especially critical since the waves propagated strike the fuselage directly whereas waves striking in adjacent areas are deflected by the normal contour of the fuselage. These directly striking waves are generally known as longitudinal waves since the generated air motion is parallel to the direction of propagation of the waves.

Figure 3:
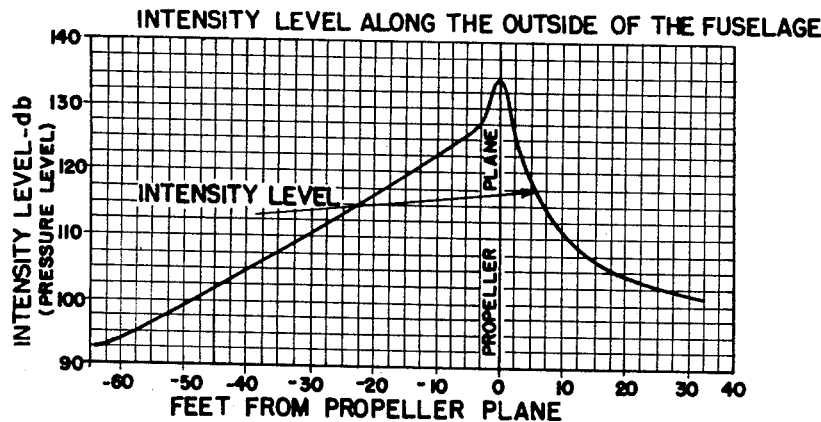
Figure 3 is a graphic representation of the intensity of pressure applied to the fuselage in an area aligned with the plane of propeller rotation.

The graph of Figure 3 shows the intensity level of pressures applied to the fuselage of an aircraft showing maximum vibration occurring along the plane of propeller rotation. The intensity of applied pressures is a suitable criterion for measuring any sound or vibration because of its physical nature. The term "intensity" usually means the total amount of sound or vibration energy which flows through a unit area normal to the direction of propagation of the wave in one second and is generally measured by the use of the decibel scale. The intensity level appearing on the fuselage measured in decibels is represented by the vertical axis of the graph ranging from 90 decibels to 140 decibels. The horizontal axis of the graph represents the number of feet commencing from the propeller plane rearwards of the aircraft for 50 feet and forward for 40 feet. It can be seen that the maximum intensity measured at approximately 134 decibels occurred about 1 foot either side of the propeller plane.

The intensity level drops sharply in the forward direction of the aircraft while a relatively tapered intensity level is experienced from the propeller plane rearwards of the aircraft.

In Figure 4, vibrator suppressor 12 is shown in close proximity to the arc of propeller blade 16 rotation. A panel 20, forming an exterior fuselage skin is shown isolated from the surrounding normal fuselage skin 13. A plurality of resilient mounting means, such as mount 22 carries the panel and is employed to suppress or dampen vibrations induced into the panel from the impact of impinging shock waves generated by the propellers. The resilient mounting means in turn are attached to a base 23 rigidly attached to the frame of the fuselage such as by stringers 24 and 25 and station member 26, as viewed through a door opening 27.

Referring to Figures 5, 6 and 7, base assembly 23 is provided with a well portion 28 integrally formed therein on which the resilient mounting means 22 are rigidly attached. A plate form 29, forming part of the mounting means, is provided for raising the panel above the supporting surface 30 of the well to a plane level with the exterior skin 13. The plate form has a flat flange 31 having corner holes for receiving screws 32 for fastening purposes to the base. Also, plate form 29 is provided with an internal annular channel 34. Mounted on the plate form is a resilient element 35, having an annular groove 36 extending around its periphery. Connection between the resilient element and the plate form is made by means of an annular washer 37 fitted into the channel and groove respectively.

The periphery of the resilient element is thickened to provide support for receiving washer 37. A center portion 38 of the resilient element is raised above the thickened periphery so that an annular connecting area 40 between the periphery and the center portion is relatively thin. This manner of construction allows the center portion great movement in the form of vibrations or oscillations.

The resilient element is preferably composed of shear rubber which is known to give the softest rate of deflection and so provides the lowest natural frequency in the smallest possible space. By mounting the resilient element as described above, an initial tension condition is given to the rubber and a characteristic of being many times as stiff radially as axially. This permits a suspension comparatively stable in any desired direction and very soft, with a low natural frequency, in the direction of the vibratory thrusts.

Extending longitudinally through the central portion 38 there is provided a sleeve 41 forming an annular passage from the top of the resilient element to the bottom thereof. A mounting bar member 42 is attached to the top portion of the element by means of a flat head elongated screw 43 extending through sleeve 41 and is employed for carrying panel 20. Threads 44 are employed to receive a nut 45 which, when tightened, firmly secures member 42 to the element. Conventional threaded screw receptacles 46 and 47 are riveted to member 42 and function to receive panel mounting screw 48 and 49. The mounting screws are flat headed and fit snugly into countersunk bores to maintain a flat exterior panel surface.

A seal 51 of conventional composition is employed between the exterior skin of the fuselage and a flange 52 provided on the base to effect proper attachment when rivets, such as rivet 53, are installed. To allow proper seating of the well portion within the interior of the fuslage, station member 26 has a cut-out portion 54 equal to the depth of the well. A plurality of L shaped supporting members 55 are employed to rigidly attach the base to stringers 24 and 25 and to station member 26. Attachment is made by riveting.

Figure 8:
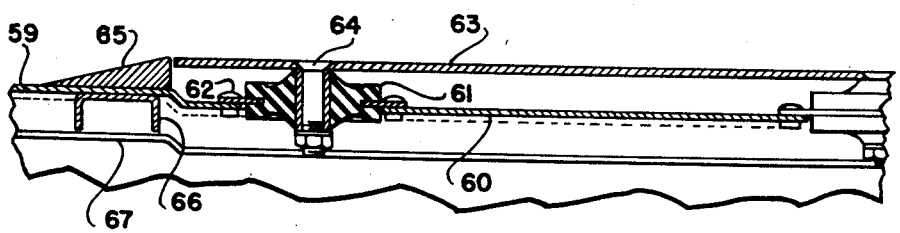
Figure 8 is an elevational view in section of another form of the present invention having a panel arranged beyond the exterior of the aircraft.

The vibration suppressor illustrated in Figure 8 is another embodiment of the present invention having its function and location in the same manner as described for the embodiment shown in Figure 5. In this embodiment, exterior skin 59 is joggled to form a slight recess 60. A plurality of resilient elements 61, including a washer 62 similar to element 35 and washer 37 employed in Figure 5, are mounted in holes provided within the confines of recess 60 and are attached to the skin by means of placing rivets to secure the washer to the skin. A panel 63 is secured directly to element 61 by means of screw and nut arrangement 64. Mounting in this manner places the panel exteriorly of the skin so that a fairing 65 is required to block or minimize an opening between the exterior skin and the periphery of the panel. Numbers 66 and 67 represent a stringer and a station member supporting the fuselage skin.

Operation may be described employing the embodiment of Figure 1 in which vibration suppressors 11 and 12 are located on each side of the aircraft fuselage 13 in alignment with the plane of propeller rotation. The size of the suppressor is large enough to include a critical area slightly behind the plane of propeller rotation receiving vortex generated vibration.

Once the proper location has been determined, the base is fitted through the fuselage exterior skin and is secured to the fuselage supporting structure and to the interior of the skin 13.

As shock waves 19 strike the panel 20, vibrations and oscillations are induced therein. The resilient element 36 mounted between the vibrating panel and the rigidly supported base 23 substantially dampens or suppresses transmission of these vibrations before reaching rigid fuselage structure where excessive vibration may cause damage or discomfort.

The panel per se will not react as a sounding board for generating its own vibration because the top portion of the panel has a tendency to retreat slightly into the depth of the well due to the force generated by the oncoming propeller blade while the lower portion of the panel projects slightly above the base due to the pull or suction of the propeller after a blade has passed the panel.

Having described only a typical apparatus for suppressing vibrations, we do not wish to be limited to the specific details herein set forth but wish to reserve to ourselves any variations or modifications that may appear to those skilled in the art and fall within the scope of the following claim.

We claim:

A vibration absorption unit for mounting in an aircraft body comprising: a base having a well section disposed centrally thereof and a peripheral mounting edge; a plurality of plate forms secured to said base within said well section; a resilient mounting means a mounting bar member and a means for securing said bar to said resilient mounting means all supported by each of said plate forms within said well section; said mounting bar extending in opposite lateral directions beyond said resilient mounting means; a panel supported on said mounting bar members adjacent the plane of said peripheral mounting edge; wherein each lateral extension of said mounting bar member is secured to said panel.

References Cited in the file of this patent

UNITED STATES PATENTS

| | | |
|---|---|---|
| 2,018,860 | Lord | Oct. 29, 1935 |
| 2,075,490 | Williams | Mar. 30, 1937 |
| 2,581,625 | Brady | Jan. 8, 1952 |